US010682932B2

(12) United States Patent
Mosch (10) Patent No.: US 10,682,932 B2
(45) Date of Patent: Jun. 16, 2020

(54) LOCK

(71) Applicant: WITTE Automotive GmbH, Velbert (DE)

(72) Inventor: Gerhard Mosch, Duisburg (DE)

(73) Assignee: WITTE Automotive GmbH, Velbert (DE)

( * ) Notice: Subject to any disclaimer, the term of this patent is extended or adjusted under 35 U.S.C. 154(b) by 906 days.

(21) Appl. No.: 15/207,785

(22) Filed: Jul. 12, 2016

(65) Prior Publication Data

US 2017/0015219 A1   Jan. 19, 2017

(30) Foreign Application Priority Data

Jul. 16, 2015 (DE) .......................... 10 2015 111 529

(51) Int. Cl.
*B60N 2/90* (2018.01)
*B60N 2/36* (2006.01)
*B60N 2/235* (2006.01)

(52) U.S. Cl.
CPC ............. *B60N 2/366* (2013.01); *Y10S 292/04* (2013.01); *Y10S 292/51* (2013.01); *Y10T 292/1047* (2015.04)

(58) Field of Classification Search
CPC ............. Y10T 292/1047; Y10S 292/04; Y10S 292/51; Y10S 292/73
USPC ........................................... 292/DIG. 4, 216
See application file for complete search history.

(56) References Cited

U.S. PATENT DOCUMENTS

| 4,334,704 | A | * | 6/1982 | Yamada | E05B 79/12 292/216 |
| 4,538,845 | A | * | 9/1985 | Yamada | E05B 85/02 292/216 |
| 4,641,747 | A | * | 2/1987 | Mestdagh | G11B 33/0444 206/308.1 |
| 4,688,695 | A | * | 8/1987 | Hirohata | G11B 15/67507 292/DIG. 4 |
| 4,756,564 | A | * | 7/1988 | Ikeda | E05B 85/26 292/216 |
| 4,792,165 | A | * | 12/1988 | Nishimura | E05C 19/022 292/19 |

(Continued)

FOREIGN PATENT DOCUMENTS

| CN | 203567577 U | 4/2014 | |
| DE | 2320351 A1 * | 10/1974 | ............. E05B 85/26 |

(Continued)

OTHER PUBLICATIONS

Office Action regarding related DE App. No. 10 2015 111 529.8; dated Apr. 21, 2016; 6 pgs.

(Continued)

*Primary Examiner* — Carlos Lugo
(74) *Attorney, Agent, or Firm* — Wiggin and Dana LLP; Gregory S. Rosenblatt (57) ABSTRACT

The invention relates to a lock comprising a housing, a rotary latch rotatably supported in the housing, a pawl for the rotary latch and an immobilization element for locking the pawl in an unblocking position and for pressing the rotary latch to a locking hoop received therein in a closed state of the lock, wherein the immobilization element is only guided in a predefined direction of movement along a round path by a guide topology.

16 Claims, 8 Drawing Sheets

(56) References Cited

U.S. PATENT DOCUMENTS

| | | | | |
|---|---|---|---|---|
| 4,854,617 A * | 8/1989 | Hayakawa | E05B 77/40 | 292/216 |
| 5,520,426 A * | 5/1996 | Arabia, Jr. | E05B 77/38 | 292/216 |
| 5,738,393 A * | 4/1998 | Chao | E05B 83/24 | 292/216 |
| 5,845,954 A * | 12/1998 | DePue | B60R 7/06 | 296/37.12 |
| 5,897,148 A * | 4/1999 | Arabia, Jr. | E05B 85/243 | 292/209 |
| 6,056,333 A * | 5/2000 | Wach | E05C 19/022 | 292/137 |
| 6,378,920 B1 * | 4/2002 | Ostrowski | E05B 83/16 | 292/216 |
| 6,485,071 B2 * | 11/2002 | Schwaiger | E05B 83/16 | 292/216 |
| 6,598,913 B2 * | 7/2003 | Meinke | E05B 85/107 | 292/336.3 |
| 6,669,250 B1 * | 12/2003 | St. Louis | E05C 19/022 | 292/304 |
| 6,749,234 B2 * | 6/2004 | Bruce | E05B 85/26 | 292/216 |
| 7,090,264 B2 * | 8/2006 | Dzurko | E05B 85/243 | 292/201 |
| 7,165,790 B2 * | 1/2007 | Bella | E05C 19/022 | 292/302 |
| 7,243,973 B2 * | 7/2007 | Plett | B62D 33/0273 | 296/57.1 |
| 7,810,853 B2 * | 10/2010 | Margheritti | E05B 81/25 | 292/216 |
| 8,100,441 B2 * | 1/2012 | Liao | E05C 19/022 | 292/300 |
| 8,348,310 B2 * | 1/2013 | Vazquez | E05B 85/26 | 292/216 |
| 9,359,796 B2 * | 6/2016 | Betzen | E05B 81/40 | |
| 9,670,701 B2 * | 6/2017 | Okawa | E05B 81/15 | |
| 2010/0187837 A1 * | 7/2010 | Danner | B60K 15/05 | 292/164 |
| 2013/0129413 A1 | 5/2013 | Dryburgh et al. | | |
| 2015/0061301 A1 | 3/2015 | Torka et al. | | |

FOREIGN PATENT DOCUMENTS

| | | | | |
|---|---|---|---|---|
| DE | 102012102724 A1 | | 10/2013 | |
| EP | 0233506 A2 * | | 8/1987 | E05B 85/26 |
| JP | 07269177 A * | | 10/1995 | |
| JP | 2010106549 A | | 5/2010 | |
| WO | 2013129413 A1 | | 7/2013 | |

OTHER PUBLICATIONS

Official Communication received from the Patent Office in China for related patent application No. CN 201610553882.3; dated Feb. 26, 2019; 5 pages.

* cited by examiner

LOCK

The present invention relates to a lock, in particular for a backrest of a motor vehicle.

A lock of the initially named kind is used, for example, in a passenger car to lock an inclinable backrest of a back seat in a upright position. In this respect, as a rule, a locking hoop is provided at the body side which engages into a rotary latch of the lock provided at the backrest. To immobilize the backrest in the upright position, an immobilization element is provided which acts on the locking hoop received in the rotary latch in the closed state of the lock against the rotary latch to prevent a relative movement between the locking hoop and the rotary latch which could be perceived as an unpleasant rattle by a vehicle occupant.

A pawl is provided for blocking the rotary latch in the closed state and is released from the rotary latch to open the lock. During the release of the pawl, the pawl brings the immobilization element against the return force of a return element into a position in which the immobilization element allows a sufficient excess movement of the rotary latch during the closing of the lock.

Locks of this kind have the disadvantage that they require a comparatively large effort of force of the user for the opening.

It is the underlying object of the invention to provide a lock which can be opened with a smaller effort of force.

The object is satisfied by a lock having a housing, a rotary latch, a pawl for locking the rotary latch and an immobilization element for locking the pawl in an unblocking position and, in particular, in that the immobilization element is driven by the rotary latch and is only guided in a predefined direction along a round path by guide topology.

The general idea underlying the invention is to decouple the movement of the immobilization element from the pawl and instead to control it by the rotary latch and by a guide topology. This has the advantage that the lock in accordance with the invention can be opened with a smaller effort of force.

Since the immobilization element can only move in the predefined direction and not, for instance, in the direction opposite to the predefined direction along the guide topology, the round path so-to-say forms a one-way street, whereby it is ensured that the immobilization element at all events adopts a position on its path through the guide topology in which an excess movement of the rotary latch required for the closing procedure is possible. In addition, the design in accordance with the invention can be manufactured particularly inexpensively and can be assembled simply since fewer parts are required in comparison with known solutions.

Advantageous embodiments can be found in the dependent claims, in the description and in the drawings.

In accordance with an embodiment, the immobilization element comprises an engagement feature, in particular a first pin, and the rotary latch comprises an entrainer for entraining the engagement feature. A movement of the immobilization element can thus be effected in a simple and reliable manner by a rotation of the rotary latch.

A guidance of the immobilization element along the round path advantageously takes place in that the guide topology is formed in the housing and receives a second pin provided at the immobilization element. Alternatively, the guide topology can be formed at the immobilization element and can receive a second pin provided at the housing. It is furthermore generally conceivable to form the guide topology for guiding the immobilization element at the rotary latch.

For a better guidance of the immobilization element, the guide topology can comprise an inner guide surface and an outer guide surface which together form a guide passage for the second pin defining the round path.

The round path advantageously at least approximately describes a triangle.

The first pin and the second pin can extend from opposite sides of the immobilization element. This has the advantage that the design of the lock is simplified since the rotary latch and the housing can be connected to the immobilization element at different sides thereof.

The guide topology can furthermore comprise a blocking element, for example a ramp, which prevents the second pin from being able to be moved against the predefined direction of movement. Such a ramp can have a slanted surface which rises in the direction of movement and which merges into an end face disposed substantially perpendicular to the direction of movement of the immobilization element. If the second pin slides over the ramp in the predefined direction of movement, the pin runs onto the slanted surface and falls off again at the end face. The second pin abuts the end face of the ramp in the opposite direction in which the immobilization element should not move. This prevents a movement of the second pin and thus of the immobilization element overall against the predefined direction of movement in a simple manner.

The second pin of the immobilization element is preferably resiliently supported and/or the ramp is flexible. It is hereby made possible that the immobilization element at least substantially does not move out of its plane of movement when sliding over the ramp. Since the immobilization element only moves within the plane of movement, no additional construction space is required outside the plane of movement so that the immobilization element can slide over the ramp.

A dividing wall can be formed at the rotary latch which is preferably elastically deformable and which prevents a direct contact between a locking hoop engaging into the rotary latch and the immobilization element. The immobilization element is hereby so-to-say shielded with respect to the locking hoop with the advantage that movements of the locking hoop, in particular vibrations of the locking hoop, which could result in an unwanted movement of the immobilization element are thereby not directly transmitted to the immobilization element.

The immobilization element can have a locking surface which can be brought into engagement with the pawl to hold the pawl in the unblocking position.

This has the advantage that a better force transmission is achieved between the immobilization element and the pawl.

The guide topology can furthermore comprise a guide abutment which is configured to limit the movement of the immobilization element, in particular when the second pin is located in a corner of the triangle, and/or to guide the movement of the immobilization element.

A spring can be connected between the rotary latch and the immobilization element and is loaded into the locking position by a rotation of the rotary latch. Such a spring satisfies an advantageous dual function in that it provides both an unscrewing or opening of the rotary latch and a moving back of the immobilization element into a release position or starting position.

The immobilization element preferably has a third pin which is guided in a guide of the housing. The abovementioned spring can be a leg spring whose one leg is in engagement with the rotary latch and whose second leg is in engagement with the immobilization element, in particular at the third pin.

A particularly inexpensive embodiment of the invention which is simple to assemble provides that the immobilization element is formed in one piece.

For a better guidance, the immobilization element can have an arm which is guided by a limitation at the housing side.

A further advantageous embodiment of the invention provides that a first passage section of the guide topology is configured to guide the second pin on the opening of the rotary latch from a position 1 in which the immobilization element is not in engagement with the pawl into a position 2 in which the immobilization element and the pawl are in engagement and the pawl is held in the unblocking position;

a second passage section of the guide topology is configured to guide the second pin on the closing of the rotary latch from the position 2 into a position 3 in which the immobilization element and the pawl again move out of engagement and the rotary latch is blocked by the pawl;

the second passage section of the guide topology is furthermore configured to guide the second pin after the blocking of the rotary latch at the position 3 by the pawl from the position 3 to a position 4 in which the immobilization element is released in order to be able to be moved, in particular by a spring, back into the position 1; and a third passage section of the guide topology is configured to guide the second pin from the position 4 back into the position 1, with the immobilization element being moved, in particular by the named spring, from the position 4 into the position 1.

In this context, the position 1 is also called the starting position or release position of the immobilization element in which the immobilization element is not in engagement with the pawl, while the position 2 is also called a locking position because the immobilization element is in engagement with the pawl and locks it in the position 2. An excess movement of the rotary latch takes place between the position 3 and the position 4. Excess movement means in this respect that the rotary latch still rotates further a little after the closing and blocking by the pawl at the position 3 until the second pin has arrived at the position 4. The immobilization element and the pawl are out of engagement in each of the positions 1, 3 and 4 so that each of these positions forms a release position.

The positions 1, 2 and 4 can be corners of a substantially triangular round path.

As has already been mentioned, the lock is configured such that the movement of the immobilization element is not controlled by the pawl, but is rather ultimately effected or controlled by the opening and closing of the rotary latch. This has the advantage that the force for moving the immobilization element is ultimately applied by the movement of the backrest and not by the actuation of a trigger lever. A spring can in particular be preloaded by a locking of the rotary latch with the help of which spring the rotary latch is subsequently opened again and the immobilization element is entrained by the rotary latch from the position 1 into the position 2. Unlike a system in which the immobilization element is controlled by the pawl, it is therefore not necessary to apply a force, in addition to the force for moving the pawl, at the trigger lever for moving the immobilization element, whereby the required trigger force of the lock is reduced.

The invention will be described in the following with reference to a purely exemplary embodiment and to the enclosed drawings. There are shown.

Figure 1:
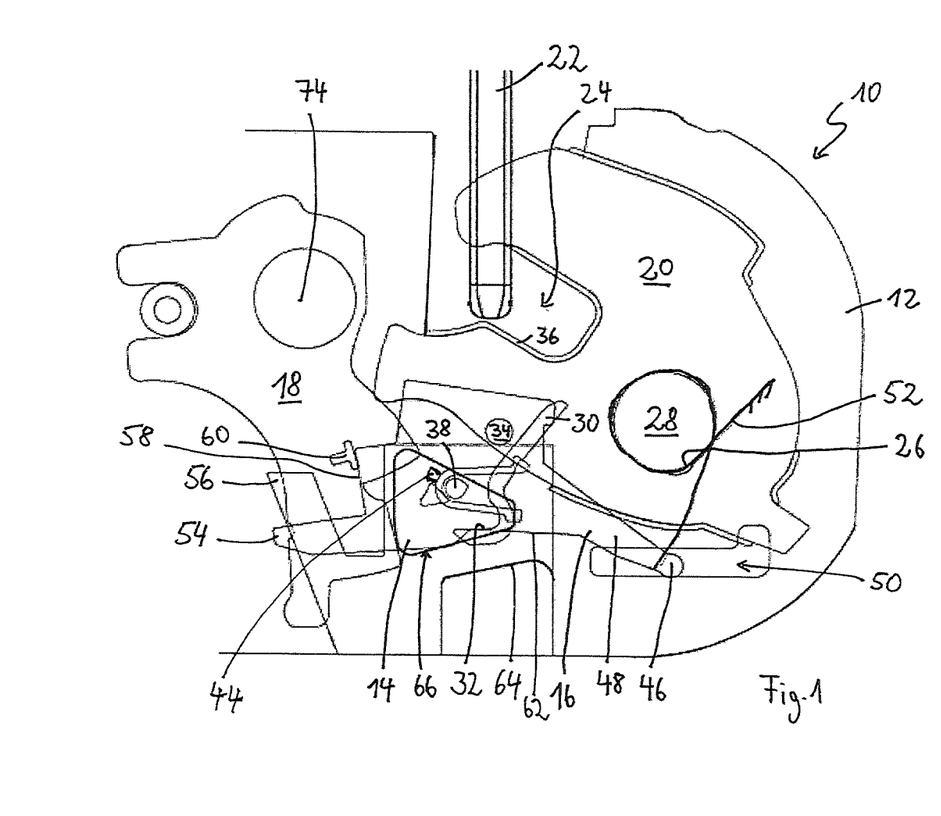
FIG. 1 a schematic diagram of a lock in accordance with the invention.

FIG. 1 shows a lock 10 which serves in a passenger car, for example, for the locking of a backrest of a rear seat in the upright position. The lock 10 comprises a housing 12, a rotary latch 20 rotatably supported at the housing 12, a pawl 18 for the rotary latch 20 and rotatably supported at the housing 12 and a plate-like immobilization element 16 displaceable along a round path 14 relative to the housing 12.

Figure 2:
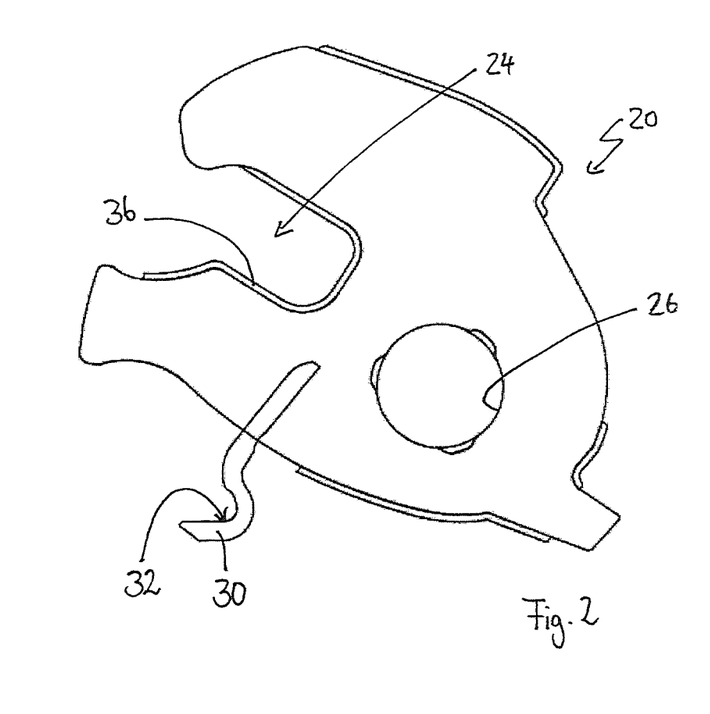
FIG. 2 a schematic diagram of a rotary latch of the lock of FIG. 1.
Figure 6A:
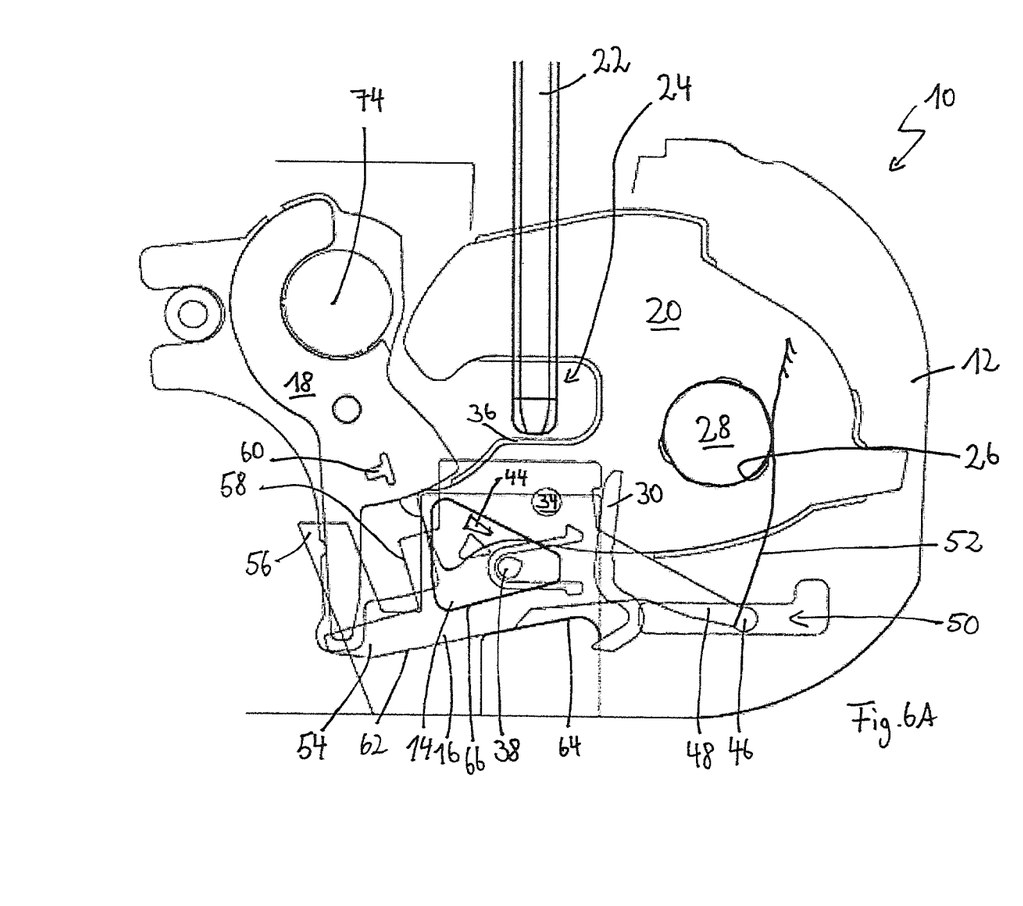
FIG. 6A the lock of FIG. 1 in a closed position.

To support the rotary latch 20 at the housing 12, the rotary latch 20 has a support bore 26 in which a support bolt 28 of the housing 12 is received (FIGS. 1 and 2). The rotary latch 20 furthermore comprises a recess 24 which is configured to receive a locking hoop 22 in an open position of the rotary latch 20 (FIG. 6B) and to hold it in a closed position of the rotary latch 20 (FIG. 6A). The rotary latch 20 furthermore has an entrainer 30 at whose one end a hook-shaped mount 32 (FIG. 2) is shaped to receive a first pin 34 (FIG. 3) of the immobilization element 16 and to entrain the immobilization element 16 on a rotational movement of the rotary latch 20.

The immobilization element 16 is supported at the housing 12 in the closed position (FIG. 6A) and presses the locking hoop 22 received in the recess 24 against the rotary latch 20, whereby the latter is rotated against the pawl 18. In this manner, an immobilization of the locking hoop 22 and of the rotary latch 20, and thus ultimately of the backrest overall, is achieved in the closed state of the lock 10.

The rotary latch 20 further comprises a dividing wall 36 which extends transversely to a plane of movement of the rotary latch 20 from a margin of the recess 24, into the plane of the paper in FIG. 2, and which is so flexible that it can be elastically deformed to a small degree. The dividing wall 36 is arranged in the closed position (FIG. 6A) between the immobilization element 16 and the locking hoop 22 received in the recess 24 and prevents a transmission of vibrations of the locking hoop 22 to the immobilization element 16 in that it prevents a direct contact between the locking hoop 22 and the immobilization element 16.

Figure 3:
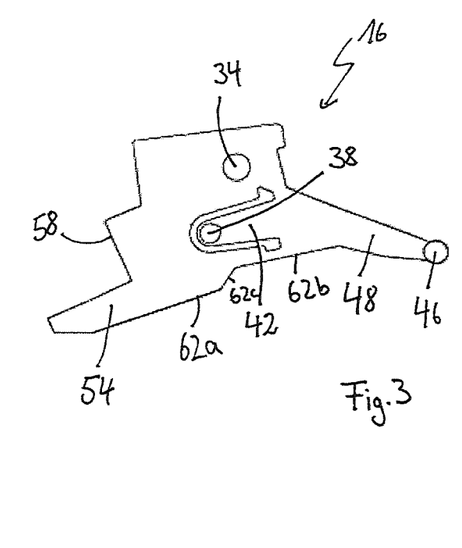
FIG. 3 a schematic diagram of an immobilization element of the lock of FIG. 1.

The immobilization element 16 is formed in one piece, as shown in FIG. 3, and has three pins 34, 38, 46 which project from the immobilization element 16 transversely to a plane of movement of the immobilization element 16, i.e. which extend transversely to the plane of the paper in FIG. 3, with the first pin 34, as already described, being configured to be entrained by the entrainer 30 of the rotary latch 20.

Figure 4A:
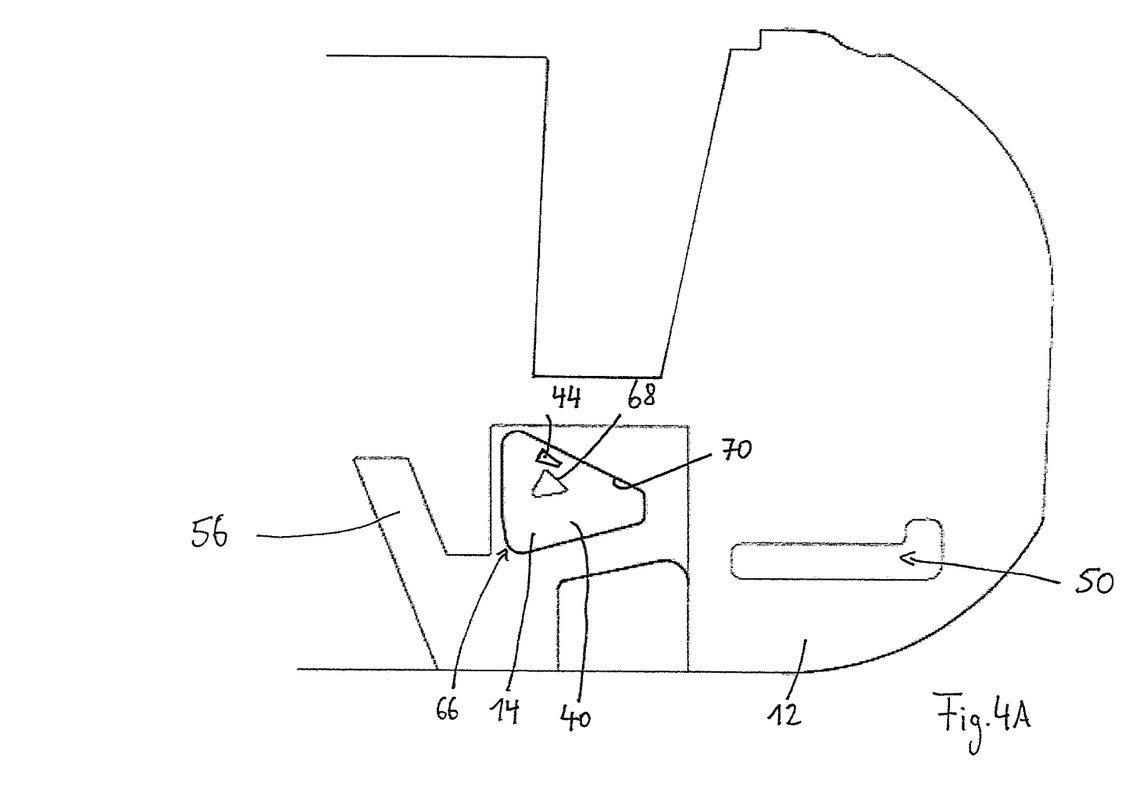
FIG. 4A a part of a housing of the lock of FIG. 1.
Figure 4B:
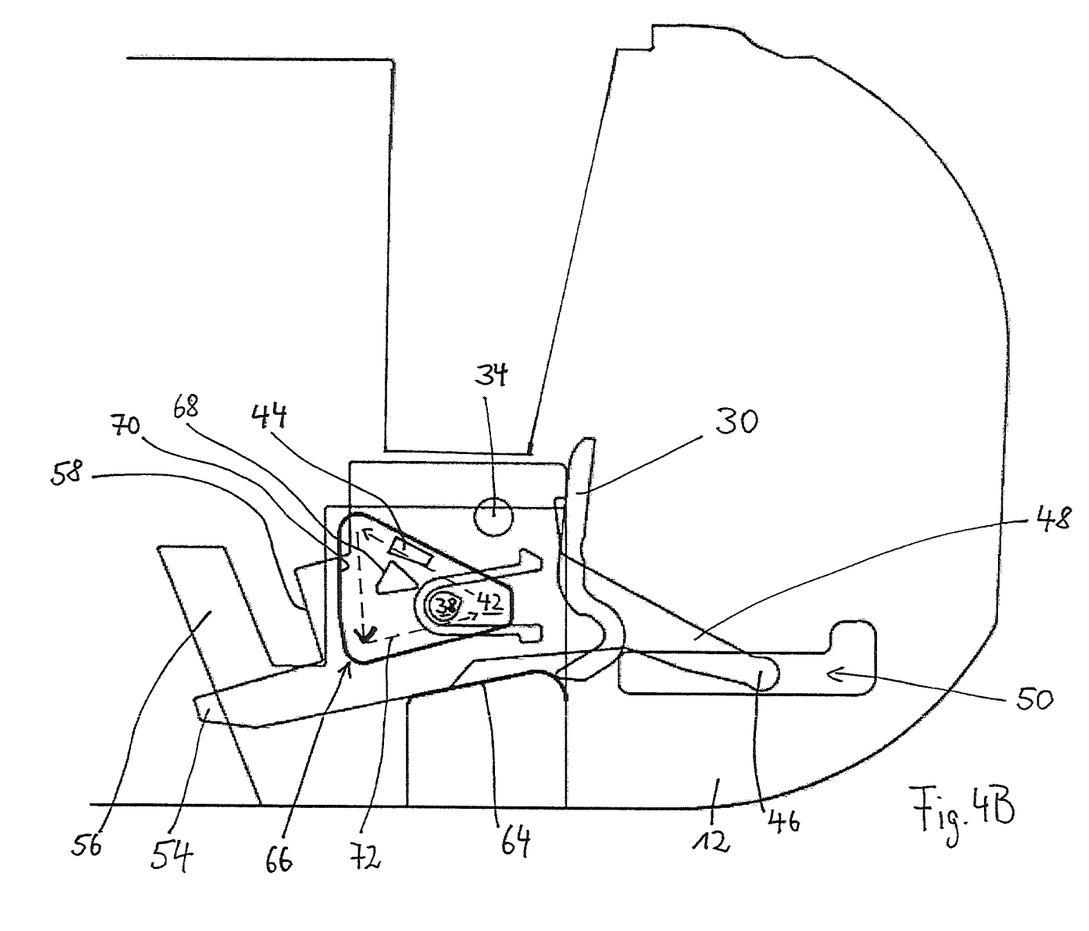
FIG. 4B the part of the housing of FIG. 4A with the immobilization element of FIG. 3 and an entrainer of the rotary latch of FIG. 2.
Figure 5:
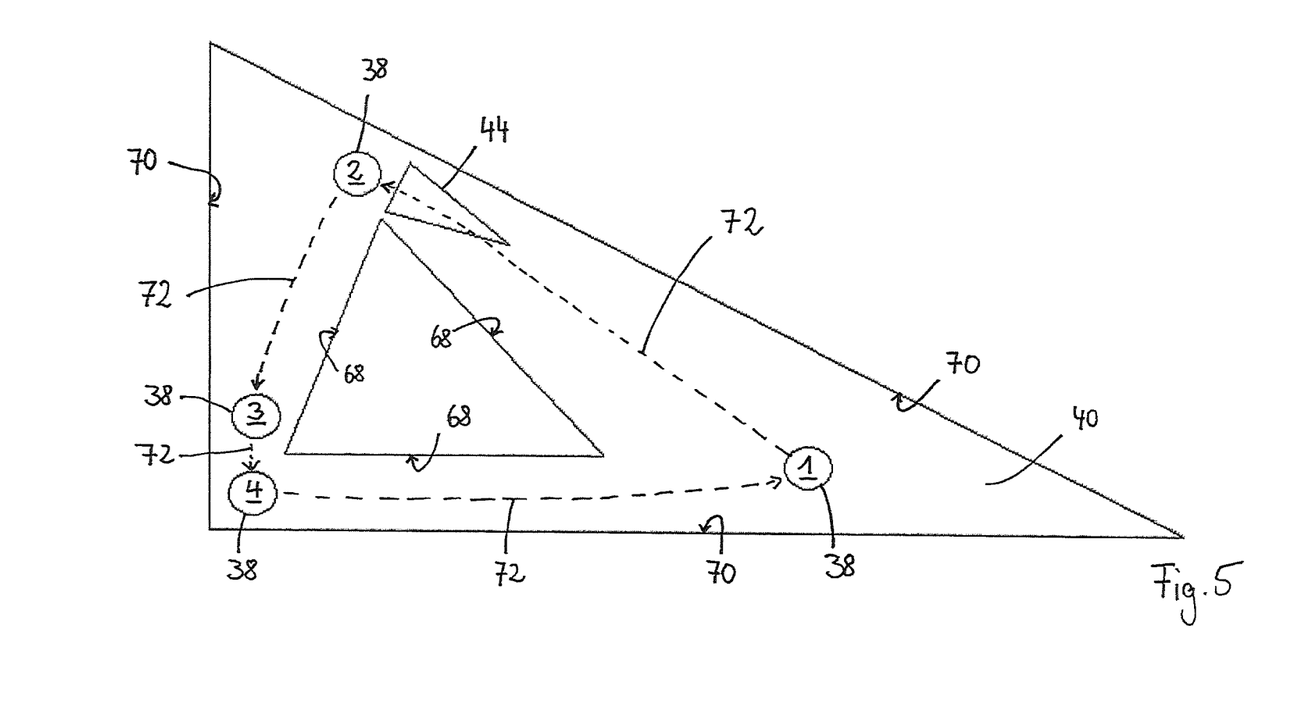
FIG. 5 a process diagram showing a movement of the immobilization element of FIG. 3 in a guide topology of the housing of FIG. 4A.

A second pin 38 engages, as shown in FIG. 4B, into a guide passage 40 of the housing 12 defining the round path 14 and is guided in said guide passage. The second pin 38 is realized in an end region of a resilient tongue 42 of the immobilization element 16 so that it can move beyond a ramp 44 formed in the guide passage 40 (FIGS. 4A and 5) without the immobilization element 16 as a whole having to move out of a plane of movement of the immobilization element 16 for this purpose. The plane of movement is defined by the displacement of the immobilization element 16 along the round path 14 which is indicated by arrows 72 in FIG. 4B.

A third pin 46 is arranged in an end region of a first arm 48 of the immobilization element 16 extending in the plane of movement and away from the pawl 18 and engages into a slot guide 50 of the housing 12. A leg spring 52 furthermore engages at the third pin 46 to move the immobilization element 16 from an excess movement position (FIG. 6C) in the direction of the closed position (FIG. 6A). The immobilization element 16 is at least partly arranged between the rotary latch 20 and the housing 12 so that the first pin 34 projects from the one side of the immobilization element 16, and indeed in the direction of the rotary latch 20, while the second pin 38 and the third pin 46 project from the other side of the immobilization element 16, namely in the direction of the housing 12.

The immobilization element 16 further comprises a second arm 54 which faces toward the pawl 18, which extends in the plane of movement of the immobilization element 16 and which is guided within a boundary 56 of the housing 12 to restrict a movement of the immobilization element 16 to the plane of movement.

Figure 6B:
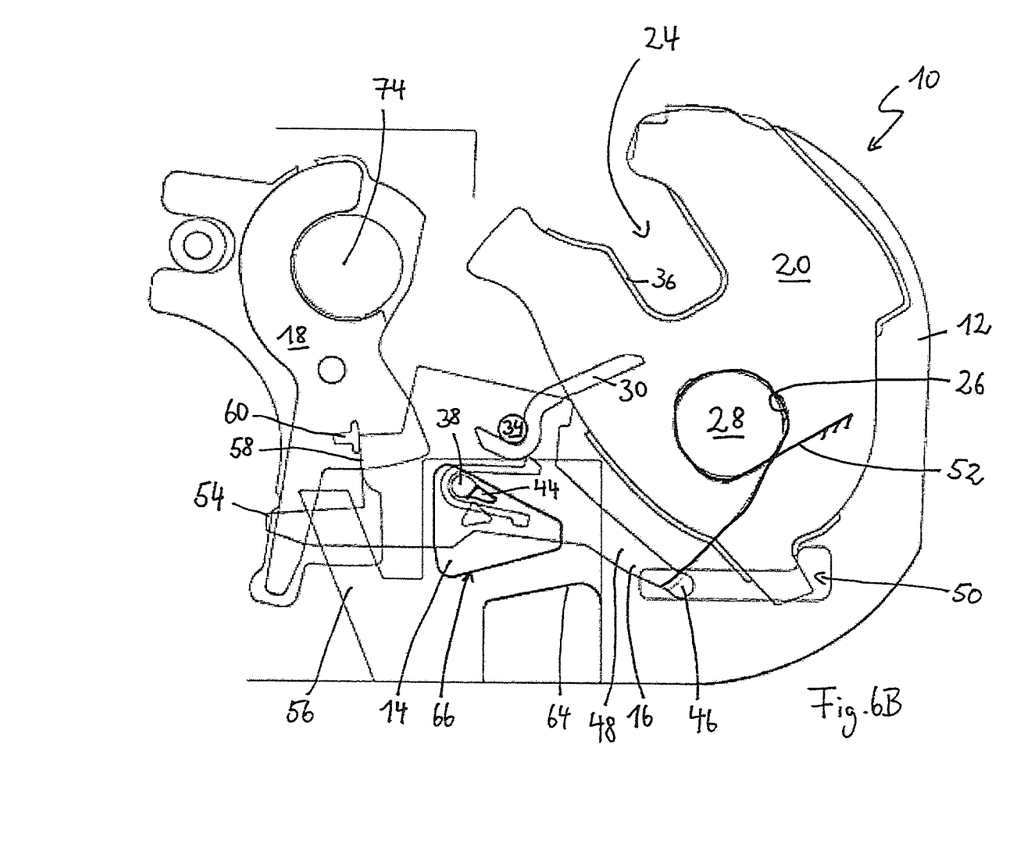
FIG. 6B the lock of FIG. 1 in a completely open state.

The immobilization element 16 additionally has a locking surface 58 which faces the pawl 18 and which is configured to come into engagement with a projection 60 of the pawl 18 to fix the pawl 18 in an unblocking position (FIG. 6B).

Figure 6C:
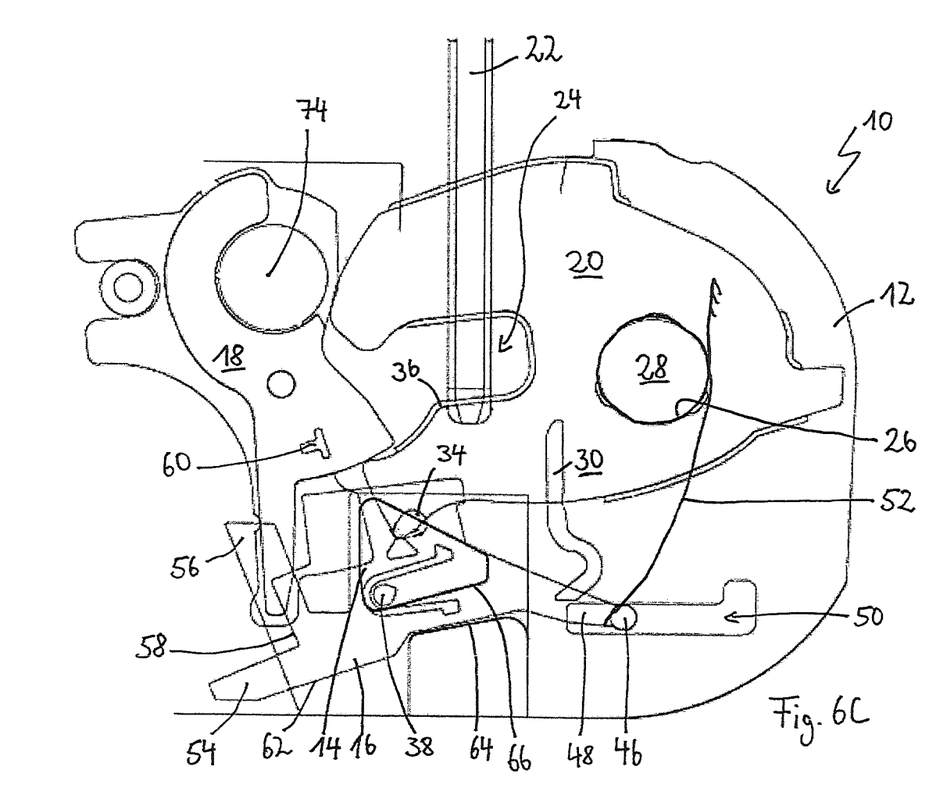
FIG. 6C the lock of FIG. 1 in a position of excess movement.

The immobilization element 16 furthermore has a guide flank 62 which is guided along a guide abutment 64 of the housing 12 and which comprises a straight first flank section 62a and a straight second flank section 62b which are connected to one another by a slope 62c and which are configured such that the first flank section 62a contacts the guide abutment 64 when the immobilization element 16 is in the closed position (FIG. 6A) and the second flank section 62b contacts the guide abutment 64 when the immobilization element 16 is in the excess movement position (FIG. 6C).

The guide passage 40 of the housing 12 extending along the substantially triangular round path 14 forms a guide topology 66 and comprises an inner guide surface 68 and an outer guide surface 70 which bound the guide passage 40 at the inner side and at the outer side. The guide topology 66 furthermore comprises the ramp 44 which is formed in the guide passage 40 and whose height increases in the direction of movement 72 of the second pin 38.

The operation of the lock 10 will be described in the following with reference to FIGS. 5 and 6A to 6C. Every indication of direction or position such as "clockwise", "up", "down", "right and left" are only intended for a simplified description of the operation with reference to the Figures and should not represent any limitation.

The second pin 38 of the immobilization element 16 guided in the guide passage 40 is located in the right corner region of the round path 14 in a position 1 (FIG. 6A). The pawl 18 adopts a blocking position in which it blocks the rotary latch 20 rotation-wise in the closed position. The locking hoop 22 is held securely in the recess 24 of the rotary latch 18.

If the pawl 18 is rotated from its blocking position into the unblocking position clockwise about a rotary pawl axis 74 by actuation of a trigger lever, not shown, the rotary latch 20 is free to open, i.e. to pivot open. The force required to pivot open the rotary latch 20 is provided by the leg spring 52 which engages at the rotary latch 20, on the one hand, and at the third pin 46, on the other hand, and is preloaded such that it moves the rotary latch 20 into an open position (see FIG. 6B) as soon as the pawl 18 releases the rotary latch 20.

The entrainer 30 of the rotary latch 20 comes into contact with the first pin 34 of the immobilization element 16 by the rotational movement of the rotary latch 20 out of the closed position (FIG. 6A) into the open position (FIG. 6B) and takes along the immobilization element 16 until the second pin 38 is guided from the position 1 (FIG. 6A) into a position 2 (FIG. 6B). The second pin 38 is guided over the ramp 44 between the position 1 and the position 2 while the tongue 42 rebounds (cf. FIG. 5).

The immobilization element 16 locks the pawl 18 in the unblocking position in the position 2 (FIG. 6B). In this respect, the immobilization element 16 is supported at the ramp 44 via the second pin 54. It is prevented by the ramp 44 that the pawl 18 presses the immobilization element 16 against the predefined direction of movement 72 (FIG. 5) back in the direction of the position 1 again. The locking hoop 22 can release from the rotary latch 20 and the backrest can be inclined.

If the backrest is placed upright again, the locking hoop 22 engages into the opened rotary latch 20 and presses or rotates it back into the closed position (FIG. 6C). The leg spring 52 is loaded in this respect. At the same time, the immobilization element 16 is pressed downwardly from the position 2 into a position 3 (cf. FIG. 5) and further into a position 4 (FIG. 6C) by the locking hoop 22 and by the separating wall 36 of the rotary latch 20 disposed therebetween.

The immobilization element 16 releases the pawl 18 at the position 3 so that said pawl is moved back into the blocking position by a spring, not shown. The second pin 38 is located at the position 3 in the region, more precisely just before the lower left corner, of the round path 14, but is still prevented by the inner guide surface 68 from being directly pulled in the direction of the position 1 by the leg spring 52.

The second pin 38 is released from the inner guide surface 68 in the position 4, i.e. in the lower left hand corner of the round path 14. At the same time, the immobilization element 16 moves into contact with the guide abutment 64 and is moved back into the starting position or position 1 along the guide abutment 64 by the leg spring 52 engaging at the third pin 46. It is ensured by the excess movement produced between position 3 and position 4 that first the rotary latch 20 is blocked and only then is the immobilization element 16 drawn back into the starting position.

Finally, it must be pointed out that a design has admittedly been described here in which the guide topology 66 is provided at the housing 12 and the second pin 38 is formed at the immobilization element 16, but that it would conversely be equally conceivable to realize the second pin 38 at the housing 12 and the guide topology 66 at the immobilization element 16.

REFERENCE NUMERAL LIST 1 position 1
2 position 2
3 position 3
4 position 4
10 lock
12 housing 14 round path
16 immobilization element
18 pawl
20 rotary latch
22 locking hoop
24 recess
26 support bore
28 support bolt
30 entrainer
32 mount
34 first pin
36 dividing wall
38 second pin
40 guide passage
42 tongue
44 ramp
46 third pin
48 first arm
50 slot guide
52 spring
54 second arm
56 boundary
58 locking surface
60 projection
62 guide flank
64 guide abutment
66 guide topology
68 inner guide surface
70 outer guide surface
72 direction of movement
74 rotary pawl axis

What is claimed is:

1. A lock configured for a backrest of a motor vehicle comprising:
a housing,
a rotary latch rotatably supported in the housing,
a pawl for locking the rotary latch, and
an immobilization element for locking the pawl in an unblocking position which is a position in which the pawl does not lock the rotary latch,
wherein the immobilization element is driven by the rotary latch and is only guided in a predefined direction of movement along a round path by a guide topology,
wherein the immobilization element comprises an engagement feature and the rotary latch has an entrainer for entraining the engagement feature when the rotary latch is moved from a closed position toward an open position, and
wherein the guide topology includes a blocking element, the blocking element configured to prevent the immobilization element from moving against the predefined direction of movement along the guide topology.

2. The lock in accordance with claim 1, wherein the engagement feature is a first pin.

3. The lock in accordance with claim 2, wherein the guide topology is formed in the housing and receives a second pin provided at the immobilization element.

4. The lock in accordance with claim 3, wherein a first passage section of the guide topology is configured to guide the second pin on the opening of the rotary latch from a first position in which the immobilization element is not in engagement with the pawl into a second position in which the immobilization element and the pawl are in engagement and the pawl is held in the unblocking position;
wherein a second passage section of the guide topology is configured to guide the second pin on the closing of the rotary latch from the second position into a third position in which the immobilization element and the pawl again move out of engagement and the rotary latch is blocked by the pawl;
wherein the second passage section of the guide topology is furthermore configured to guide the second pin after the blocking of the rotary latch at the third position by the pawl from the third position into a fourth position in which the immobilization element is released in order to be able to be moved back into the first position; and
wherein a third passage section of the guide topology is configured to guide the second pin from the fourth position back into the first position, with the immobilization element being moved from the fourth position into the first position.

5. The lock in accordance with claim 4, wherein the second passage section of the guide topology is furthermore configured to guide the second pin after the blocking of the rotary latch at the third position by the pawl from the third position into the fourth position in which the immobilization element is released in order to be able to be moved back into the first position by a spring.

6. The lock in accordance with claim 4, wherein the third passage section of the guide topology is configured to guide the second pin from the fourth position back into the first position, with the immobilization element being moved from the fourth position into the first position by a spring.

7. A lock in accordance with claim 4, wherein the first, second and fourth positions are corners of a substantially triangular round path.

8. The lock in accordance with claim 3, wherein the guide topology comprises an inner guide surface and an outer guide surface which together form a guide passage for the second pin, and with the guide passage defining the round path.

9. The lock in accordance with claim 1, wherein the round path at least approximately describes a triangle.

10. The lock in accordance with claim 3, wherein the immobilization element comprises a first pin and the rotary latch has an entrainer for entraining the first pin, wherein the first pin and the second pin extend from opposite sides of the immobilization element.

11. The lock in accordance with claim 3, wherein the blocking element is configured to prevent the second pin from being able to move against the predefined direction of movement.

12. The lock in accordance with claim 11, wherein the blocking element is a ramp.

13. The lock in accordance with claim 11, wherein the second pin of the immobilization element is resiliently supported and/or the blocking element is flexible.

14. A lock configured for a backrest of a motor vehicle comprising:
a housing comprising a guide abutment configured to limit movement of an immobilization element and to guide the movement of the immobilization element,
a rotary latch rotatably supported in the housing,
a pawl for locking the rotary latch, and
the immobilization element for locking the pawl in an unblocking position which is a position in which the pawl does not lock the rotary latch,
wherein the immobilization element is driven by the rotary latch and is only guided in a predefined direction of movement along a round path by a guide topology, and
wherein the guide topology includes a blocking element, the blocking element configured to prevent the immobilization element from moving against the predefined direction of movement along the guide topology.

15. A lock configured for a backrest of a motor vehicle comprising:
   a housing,
   a rotary latch rotatably supported in the housing,
   a pawl for locking the rotary latch,
   a spring, with the spring abutting both the rotary latch and an immobilization element and being pre-biased by a rotation of the rotary latch into the closed position, and
   the immobilization element for locking the pawl in an unblocking position which is a position in which the pawl does not lock the rotary latch,
   wherein the immobilization element is driven by the rotary latch and is only guided in a predefined direction of movement along a round path by a guide topology, and
   wherein the guide topology includes a blocking element, the blocking element configured to prevent the immobilization element from moving against the predefined direction of movement along the guide topology.

16. The lock in accordance with claim 1, wherein the immobilization element is formed in one piece and/or has a second arm, with the second arm being guided by a boundary at a housing side.

* * * * *